(12) United States Patent
Suruvu et al.

(10) Patent No.: US 11,076,428 B2
(45) Date of Patent: Jul. 27, 2021

(54) RANDOM ACCESS PROCEDURE MODIFICATION IN INTERNET OF THINGS COMMUNICATION

(71) Applicant: QUALCOMM Incorporated, San Diego, CA (US)

(72) Inventors: Naga Sekhar Suruvu, Hyderabad (IN); Raghavendra Shyam Ananda, Hyderabad (IN); Srikanth Menon, Hyderabad (IN); Siva Kishore Reddy Yerrapareddy, Kadapa (IN); Karthik Pavan Krishna Bhogaraju, Hyderabad (IN); Rasul Mastan Mahammad, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/566,702

(22) Filed: Sep. 10, 2019

(65) Prior Publication Data

US 2021/0068158 A1 Mar. 4, 2021

(30) Foreign Application Priority Data

Aug. 30, 2019 (IN) .............................. 201941035073

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC .............. H04W 56/001; H04W 56/005; H04W 74/0833; H04W 74/006; H04W 72/0446; H04L 1/0047
See application file for complete search history.

(56) References Cited

U.S. PATENT DOCUMENTS

2013/0176953 A1* 7/2013 Stern-Berkowitz ......................... H04W 52/281
370/329
2016/0066228 A1* 3/2016 Fan ....................... H04W 36/08
370/331
(Continued)

FOREIGN PATENT DOCUMENTS

WO 2019104545 A1 6/2019

OTHER PUBLICATIONS

"3rd Generation Partnership Project, Technical Specification Group Radio Access Network, Evolved Universal Terrestrial Radio Access (E-UTRA), Medium Access Control (MAC) protocol specification (Release 15)", 3GPP Standard, Technical Specification, 3GPP TS 36.321, 3RD Generation Partnership Project (3GPP), Mobile Competence Centre, 650, Route Des Lucioles, F-06921, Sophia-Antipolis Cedex, France, vol. RAN WG2, No. V15.6.0, Jun. 27, 2019 (Jun. 27, 2019), XP051754436, pp. 1-133, [retrieved on Jun. 27, 2019] section 1, section 3, section 5.1.

(Continued)

*Primary Examiner* — Kan Yuen

(57) ABSTRACT

Methods, systems, and devices for wireless communication are described. A user equipment (UE) may receive configuration information from a base station. The UE may determine, based at least in part on the configuration information, a number of subframes available within a random access response (RAR) time window for downlink control channel communications. The UE may modify a random access procedure based on the determined number of subframes available within the RAR time window for the downlink control channel communications. In one example, modifying the random access procedure may include skipping a decoding attempt using a decoding hypothesis. In another (Continued)

example, modifying the random access procedure may include aborting the random access procedure.

30 Claims, 8 Drawing Sheets

(56) References Cited

U.S. PATENT DOCUMENTS

2016/0330766 A1* 11/2016 Liu .................. H04W 72/0446
2018/0368181 A1* 12/2018 Lee .................... H04W 24/08

OTHER PUBLICATIONS

International Search Report and Written Opinion—PCT/US2020/048587—ISA/EPO—Oct. 27, 2020.

* cited by examiner

|    | S    | G | r  | Rmax | Ri   | Ni  | N  |
|----|------|---|----|------|------|-----|----|
| R1 | 1280 | 2 | 10 | 2048 | 256  | 32  | 56 |
| R2 | 1280 | 2 | 10 | 2048 | 512  | 64  | 56 |
| R3 | 1280 | 2 | 10 | 2048 | 1024 | 128 | 56 |
| R4 | 1280 | 2 | 10 | 2048 | 2048 | 256 | 56 |

RANDOM ACCESS PROCEDURE MODIFICATION IN INTERNET OF THINGS COMMUNICATION

CROSS REFERENCES

The present Application for Patent claims the benefit of India Provisional Patent Application No. 201941035073 by SURUVU, et al., entitled "RANDOM ACCESS PROCEDURE MODIFICATION IN INTERNET OF THINGS COMMUNICATION" filed Aug. 30, 2019, assigned to the assignee hereof, and expressly incorporated herein.

BACKGROUND

Field of the Disclosure

The following relates generally to wireless communication, and more specifically to random access procedure modification in Internet-of-Things (IoT) communication.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some UEs may be configured as Internet-of-Things (IoT) UEs (e.g., low-cost UEs) that communicate with one or more base stations, but have capabilities that are different than other types of UEs. Examples of IoT UEs may include machine-type communication (e.g., MTC, eMTC, CatM) UEs and narrowband IoT (NB-IoT) UEs. IoT UEs may be power-limited such that an IoT UE's battery life may last a relatively long time (e.g., for years, such as ~10 years) compared to other UEs. IoT UEs may also be capable of communicating with base stations under relatively poor channel conditions (e.g., with a signal-to-noise ratio of −15 dB) using coverage enhancement techniques. In one example, IoT UEs may use repetitions, or bundling, as a coverage enhancement technique. An IoT UE may be configured to time share communication resources with other radio access technologies. The number of resources available to an IoT UE for communication may be limited in some scenarios.

SUMMARY

The described techniques relate to improved methods, systems, devices, or apparatuses that support random access procedure modification in Internet-of-Things (IoT) communication.

A method of wireless communication is described. The method may include receiving configuration information from a base station, determining, based at least in part on the configuration information, a number of subframes available within a random access response (RAR) time window for downlink control channel communications, and modifying a random access procedure based on the determined number of subframes available within the RAR time window for the downlink control channel communications.

A user equipment (UE) for wireless communication is described. The UE may include a processor, memory coupled to the processor, and instructions stored in the memory. The instructions may be executable by the processor to cause the UE to receive configuration information from a base station, determine, based at least in part on the configuration information, a number of subframes available within a random access response (RAR) time window for downlink control channel communications, and modify a random access procedure based on the determined number of subframes available within the RAR time window for the downlink control channel communications.

An apparatus for wireless communication is described. The apparatus may include means for receiving configuration information from a base station, means for determining, based at least in part on the configuration information, a number of subframes available within a random access response (RAR) time window for downlink control channel communications, and means for modifying a random access procedure based on the determined number of subframes available within the RAR time window for the downlink control channel communications.

A non-transitory computer readable medium storing code for wireless communication is described. The code may include instructions executable by a processor to receive configuration information from a base station, determine, based at least in part on the configuration information, a number of subframes available within a random access response (RAR) time window for downlink control channel communications, and modify a random access procedure based on the determined number of subframes available within the RAR time window for the downlink control channel communications.

DETAILED DESCRIPTION

Various aspects of the disclosure provide techniques for modifying a random access procedure in Internet-of-Things (IoT) communications. In some examples, a user equipment (UE) may determine to modify a random access procedure based on configuration information received from a base station. Based on the configuration information, the UE may determine, a priori, a possibility of expecting sufficient resources in a random access response to decode a channel (e.g., a control channel) using a decoding hypothesis. The UE may attempt to decode the channel using the decoding hypothesis if sufficient resources are available. Alternatively, the UE may skip decoding using the decoding hypothesis, or abort the random access procedure, if sufficient resources are not available.

In one example, the UE may determine, based on the configuration information, a number of subframes available within a RAR time window for downlink control channel communications and may compare the number of subframes available to a number of subframe repetitions associated with a decoding hypothesis. Based on the comparison, the UE may determine to modify the random access procedure. For example, if the number of subframes available is less than the number of subframe repetitions associated with the decoding hypothesis, the UE may modify the random access procedure by skipping a decoding attempt of an RAR using the decoding hypothesis and/or the UE may abort the random access procedure. In some examples, the UE may conserve battery power by opportunistically modifying a random access procedure.

Aspects of the disclosure are initially described in the context of a wireless communications system. Aspects of the disclosure are further illustrated by and described with reference to apparatus diagrams, system diagrams, and flowcharts that relate to random access procedure modification in IoT communication.

Figure 1:
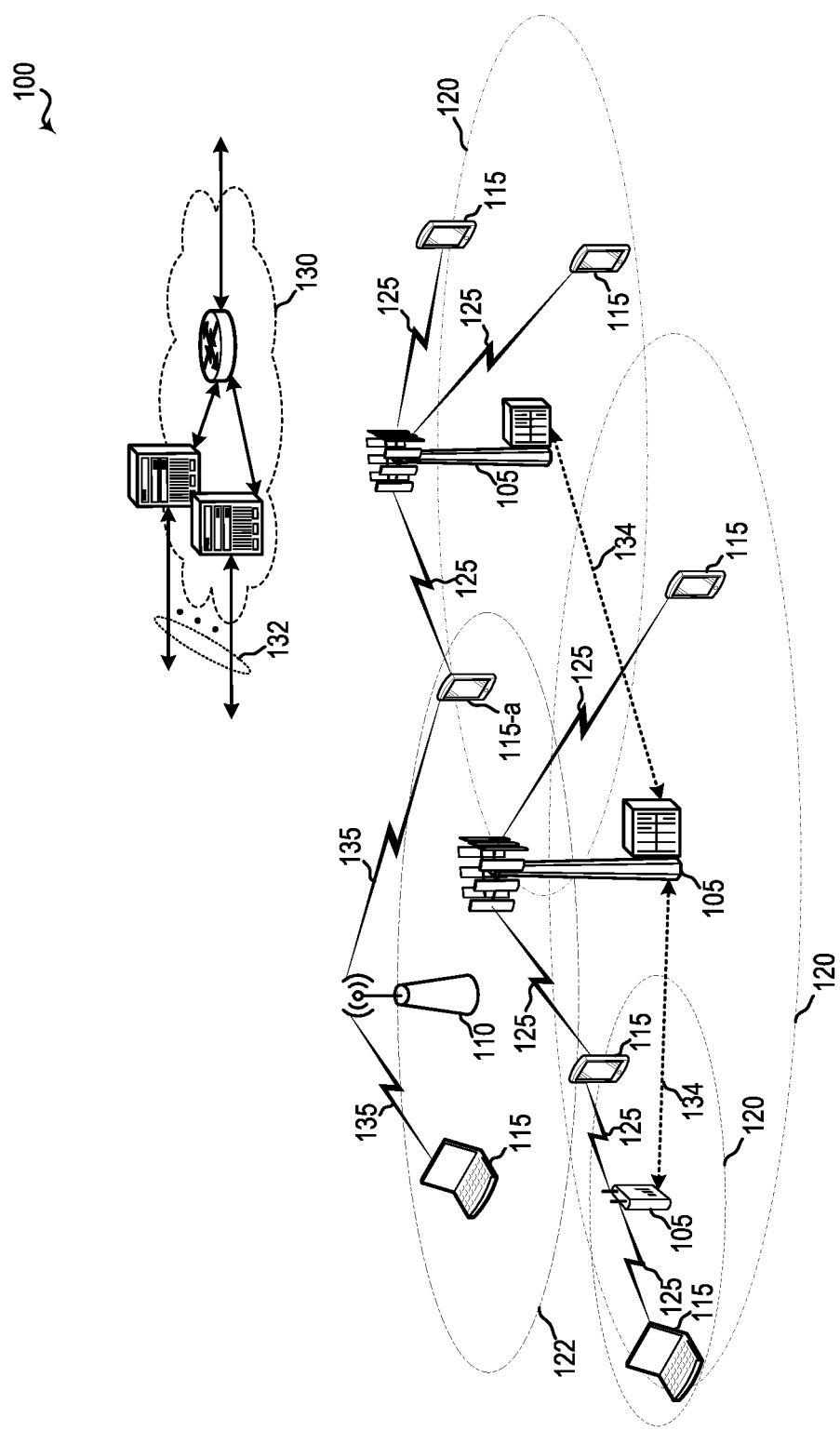
FIG. 1 illustrates an example of a system for wireless communication that supports random access procedure modification in Internet-of-Things (IoT) communication in accordance with aspects of the present disclosure.

FIG. 1 illustrates an example of a wireless communications system 100 that supports random access procedure modification in IoT communication in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

By way of example, base station 105 may be configured to transmit various types of configuration information to UE 115. This configuration information may include synchronization signals, system information, and various other types of information. Base station 105 and UE 115 may be configured to execute a random access procedure. Moreover, UE 115 may be configured to modify one or more aspects of the random access procedure based at least in part on the configuration information it receives from base station 105. Further details of a random access procedure, and modification thereof, are described below.

Figure 2:
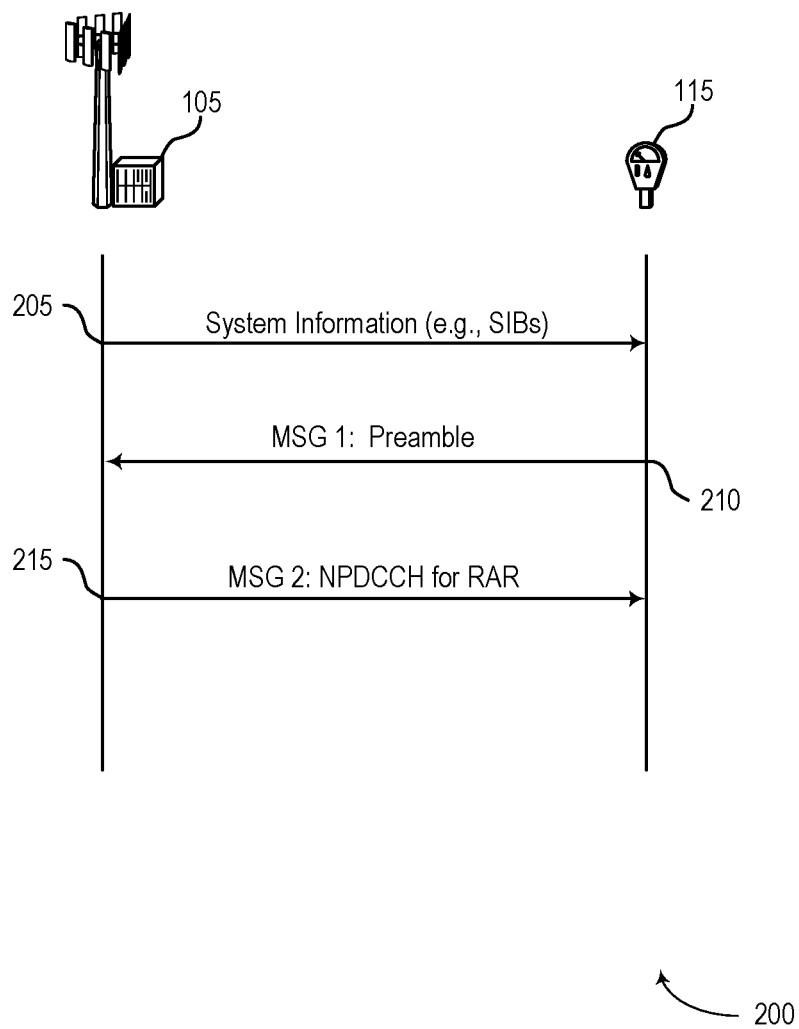
FIG. 2 illustrates a call flow diagram that supports random access procedure modification in IoT communication in accordance with aspects of the present disclosure.

FIG. 2 illustrates a call flow 200 of a portion of a random access procedure (e.g., a narrowband physical random access channel (NPRACH) process) with reference to an IoT UE 115 and base station 105. In some examples, IoT UE 115 may be a NB-IoT UE. The following description is provided in the context of NB-IoT technology. However, it is contemplated that the aspects and techniques described below may be applicable to other technologies. At 205, base station 105 communicates information to UE 115 in one or more signals. The information communicated by base station 105 may enable UE 115 to acquire and camp on a cell. Examples of information that base station 105 may communicate includes synchronization signals, such as primary synchronization signals (e.g., a narrowband primary synchronization signal (NPSS)) and secondary synchronization signals (e.g., a narrowband secondary synchronization signal (NSSS)), and system information (e.g., system information communicated in master information blocks (e.g., a narrowband master information block (NMIB)) and system information blocks (e.g., narrowband system information blocks (e.g., SIB1-NB, SIB2-NB))). Further details of information that may be communicated from base station 105 are described below with reference to FIG. 3. The information communicated by base station 105 may include various parameters for configuring a random access procedure.

At 210, UE 115 may transmit a random access preamble, also known as message 1 (MSG 1), which may start the random access procedure. In response to receiving the random access preamble, base station 105 may transmit a random access response (RAR) at 215. The RAR may be referred to as message 2 (MSG 2) in the random access procedure and may include a downlink control channel (e.g., narrowband physical downlink control channel (NPDCCH or NPDCCH-RA)). Although not shown, various other messages (e.g., MSG 3, MSG 4) may be exchanged between base station 105 and UE 115 as part of the random access procedure.

As a NB-IoT device, UE 115 may use repetitions of signals (e.g., downlink signals, uplink signals) to enable operation in relatively poor conditions. In one example, UE 115 may use several repetitions (e.g., 256, 512, 1024, 2048 repetitions to name just a few examples) of a downlink channel (e.g., NPDCCH) to properly decode the channel (e.g., to decode a DL/UL grant). NB-IoT may use one resource block for communication, and the repetitions may occur in time across different subframes such that UE 115 may be active for a time period (e.g., several seconds) to decode a channel.

Moreover, resources used for NB-IoT communications may be time shared with other radio access technologies (RATs) such as LTE, GERAN, etc. To time share, a downlink bitmap (DL-Bitmap) and or a downlink gap (DL-Gap) may be used on the NB-IoT carrier. When a time shared configuration is enabled by a network, the resources available to NB-IoT UE 115 may be relatively limited.

If the resources available for NB-IoT UE 115 in a time window of the RAR, at 215, are not sufficient to accommodate enough repetitions of NPDCCH, UE 115 may fail to decode NPDCCH resulting in a RACH failure. Eventually, an RAR-window may expire and UE 115 may retransmit the random access preamble. Techniques are described below to a priori determine the possibility of expecting a sufficient number of repetitions in a RAR and to modify the random access procedure if a sufficient number repetitions are not expected to be received by UE 115.

Figure 3:
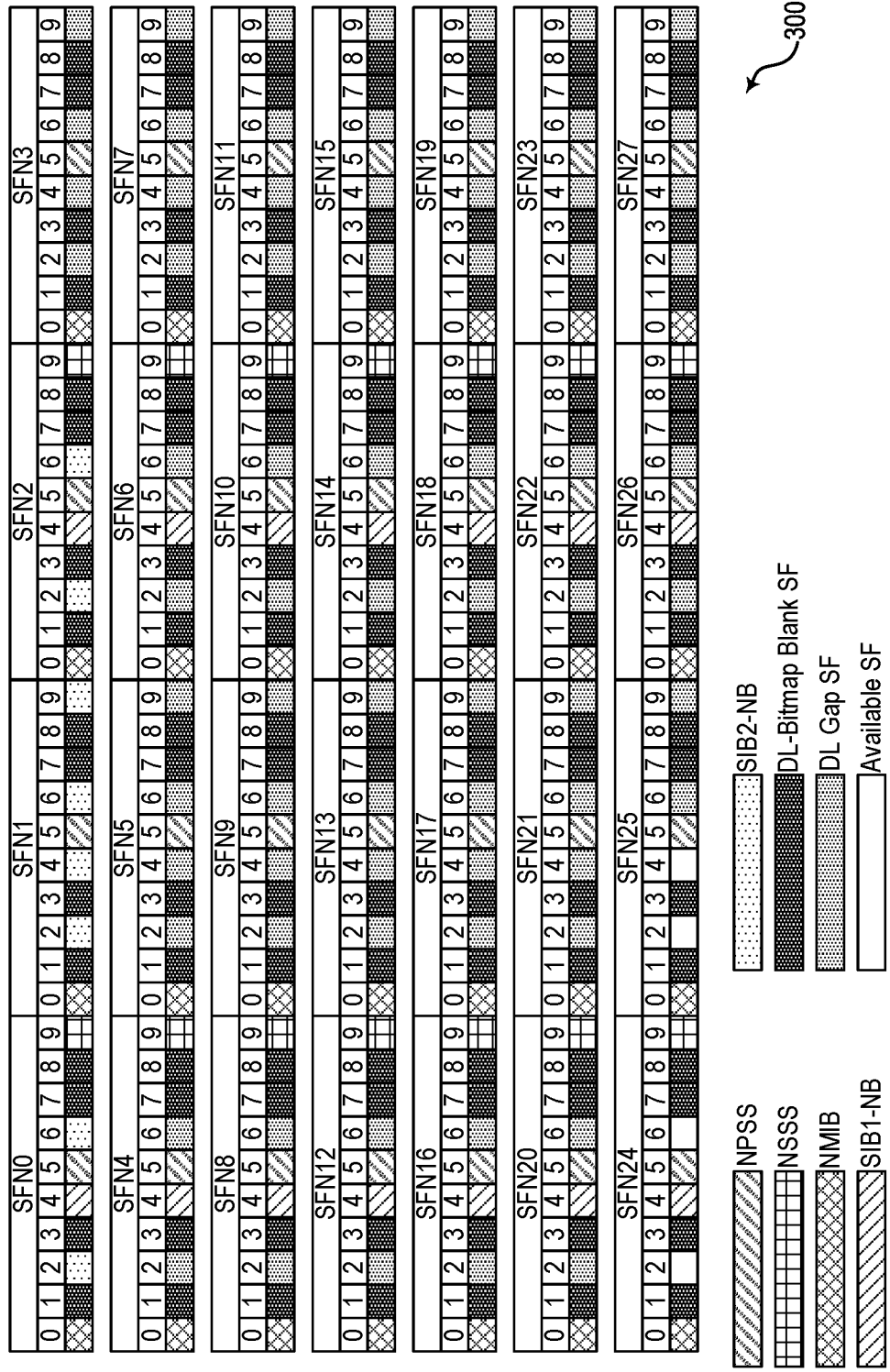
FIG. 3 is a depiction of example frames and subframes for IoT communications in accordance with aspects of the present disclosure.

FIG. 3 is a diagram 300 of downlink signals and/or channels that may be communicated from base station 105 to UE 115 in accordance with one example. The downlink signals are arranged into frames (e.g., system frame numbers (SFN) 0-27) each made up of ten subframes (0-9). Various types of downlink signals and/or channels may be transmitted in the subframes as shown. The configuration of the subframes (e.g., the types of transmissions reserved for the subframes) may be configurable by the network. The frames and subframes depicted in FIG. 3 correspond to NB-IoT signals and/or channels over a DL-Gap period with the implementation of a DL-Bitmap and a DL-Gap. In the example of FIG. 3, the configuration corresponds to the following configurable parameters:

| | |
|---|---|
| Rmax | 2048 repetitions |
| G | 2 |
| SI-Window (S) | 1280 ms |
| RAR-window size (r) in pp | 10 |
| DL-Bitmap | 1010111001 |
| DL-Gap period (Tg) | 256 ms |
| DL-Gap coefficient | 0.25 |
| Gap duration | 64 ms |
| Number of available subframes in S | 56 |
| Number of available subframes in RAR-window | 448 | where Rmax is a maximum number of repetitions (e.g., signaled by base station 105), G is the NPDCCH start subframe, SI-Window is the SIB scheduling window duration, RAR-Window is the RAR time window duration represented in terms of a NPDCCH period (pp), DL-Bitmap is a bit map representing the availability of DL subframes (1 representing available and 0 representing unavailable) for NB-IoT signals, DL-Gap period is the period of a DL gap, DL-Gap coefficient is a coefficient related to the DL gap, Gap duration is the duration of a DL gap derived from the DL-Gap period and DL-Gap coefficient, Number of available subframes in S is the number of subframes within the SI-Window available for a narrowband channel (e.g., NPDCCH), and Number of available subframes in RAR-window is the number of subframes within the RAR-window available for a narrowband channel.

In some examples, a DL-Bitmap may be static and may be 10 bits in length or 40 bits in length (e.g., for in-band mode).

In one example, all subframes other than 0, 4, 5 and 9 may be disabled for NB-IoT transmission, and a DL-Gap may occur periodically every Tg milliseconds (ms) and block NPDCCH and/or narrowband physical downlink shared channel (NPDSCH) transmissions for a fraction of the Tg duration.

To acquire and camp on a cell, UE 115 may decode NPSS, NSSS, NMIB, SIB1-NB and SIB2-NB. According to the configuration depicted in FIG. 3, NPSS may be transmitted in subframe 5 of each frame and NSSS may be transmitted in subframe 9 of every even frame (e.g., SFN0, SFN2, SFN4, etc.). NMIB may be transmitted in subframe 0 of every frame and SIB1-NB may be transmitted in subframe 4 of every even frame (e.g., SFN0, SFN2, SFN4, etc.). SIB2-NB may be transmitted in subframe 2 and 6 of SFN0 and SFN2 and subframe 2, 4, 6 and 9 of SFN1. A blank DL bitmap subframe may be provided in subframes 1, 3, 7 and 8 of every frame, and a DL gap subframe may be provided in subframes 2, 4, 6 and 9 of SFN3, SFN5, SFN7, SFN9, SFN 11, SFN13, SFN15, SFN 17, SFN19, SFN21, SFN23 and SFN27 and subframes 2 and 6 of SFN4, SFN6, SFN8, SFN10, SFN12, SFN14, SFN16, SFN18, SFN20, SFN22 and SFN26. Subframes 2 and 6 of SFN24 and subframes 2 and 4 of SFN25 may be available for other transmissions from base station 105 such as NPDCCH.

From SIB1-NB UE 115 may determine scheduling information for SIBx-NB, the SI-window and the DL-Bitmap. From SIB2-NB UE 115 may determine the DL-Gap and NPRACH and NPDCCH configurations (e.g., r, Rmax, RAR-window, number of subframes available for NPDCCH, etc.). After decoding SIB2-NB, UE 215 may receive a RACH trigger from a medium access control (MAC) layer and may initiate a NPRACH process or procedure (as described with reference to FIG. 2) by transmitting MSG 1.

When DL-Bitmap and/or DL-Gap is enabled at a base station (e.g., as depicted in FIG. 3), many of the resources or subframes are occupied by NPSS, NSSS, NMIB, SIB1-NB, SIB2-NB, DL-Bitmap blank subframes and DL-Gap subframes leaving relatively few resources for NPDCCH and/or NPDSCH transmissions. Various parameters such as DL-Bitmap, DL-Gap, RAR window, and Rmax may be configured to enable UE 115 to decode NPDCCH within the RAR window.

After transmitting the random access preamble, if UE 115 cannot find enough NPDCCH repetitions carrying a DL grant for the RAR (MSG2) in the RAR-window, UE 115 may fail to decode the RAR and declare a RACH failure. The RAR window size may be upper bounded (e.g., such as 10.24 seconds (s)). In one example, the RAR window size may be determined by the following equation $$\min\{\text{signaled value}(s) \times \text{PDCCH period}, 10.24\}(s) = \min\{r \times R\max \times G, 10240\}(ms) \quad (1)$$

The RAR window size may not accommodate all Rmax repetitions of NPDCCH if Rmax is relatively high. From the initial preamble (MSG1) transmission to RACH failure UE 115 may be active for some time, which consumes battery power.

In the example configuration associated with FIG. 3, 56 subframes are available in one SI-window and 448 subframes (56 subframes of the SI-Window×8=448) are available in the RAR-window for NB-IoT (e.g., NPDCCH) transmissions. To decode NPDCCH for a given Rmax value, UE 115 may try multiple decoding hypothesis each with an associated number of repetitions (e.g., NPDCCH repetitions). In one example, four decoding hypothesis may be provided with repetitions based on Rmax. These four decoding hypothesis may be referred to as R1, R2, R3 and R4 with repetitions determined by R1=Rmax/8, R2=Rmax/4, R3=Rmax/2 and R4=Rmax. In a scenario where the signal-to-noise ratio (SNR) is relatively high, UE 115 may be able to decode a channel (e.g., NPDCCH) using R1 (Rmax/8) repetitions. In another scenario where the SNR is relatively low, UE 115 may attempt to decode a channel using all the hypothesis (e.g., R1-R4). A UE in poor coverage may need a large number of repetitions (e.g., 2048 repetitions) within an RAR window to decode a channel.

Based on one or more parameters received in configuration information from base station 105, UE 115 may determine whether it may receive a sufficient number of repetitions of a channel within an RAR time window in order to decode the channel using one or more decoding hypotheses. In one example, UE 115 may determine the SI-window (S) size and/or the RAR-window size (r). Based on the S and/or r, UE 115 may lower bound the number of available subframes needed within an SI-window to receive a sufficient number of repetitions within an RAR window for a decoding hypothesis (e.g., R1, R2, R3 and/or R4). The lower bound may be a subframe threshold (Ni), and may be determined based on the following equation:

$$Ni = \left\lceil \frac{S \times Ri}{\min\{r \times R\max \times G, 10240\}} \right\rceil \quad (2)$$

where S is the SI window size in ms, Ri is the number of repetitions associated with a decoding hypothesis (e.g., R1=Rmax/8, R2=Rmax/4, R3=Rmax/2, R4=Rmax), and Rmax is a maximum number of repetitions, G the NPDCCH start subframe and r is the RAR window size in pp.

Figure 4:
FIG. 4 is a table of parameters and configurations for supporting random access procedure modification in IoT communication in accordance with aspects of the present disclosure.

FIG. 4 is a table 400 of parameters S, G, r, Rmax, Ri, Ni and N, according to one example, associated with R1-R4. If the number (N) of available subframes for a channel (e.g., NPDCCH) within an SI-window is equal to or greater than Ni, UE 115 may be able to decode the channel using the associated decoding hypothesis. In the example of FIG. 4, the number (N) of subframes available for a channel in the SI-window is 56 subframes (which corresponds to 448 subframes available in the RAR window in this example). For R1, R2, R3 and R4, Ni is, respectively, 32, 64, 128 and 256. Comparing N and the Ni's of R1-R4, Ni of R1 is less than N, and the Ni's of R2-R4 are greater than N. Comparing the number of subframes available in the RAR window (e.g., 448) and Ri's of R1-R4, the Ri of R1 (e.g., 256) is less than the number of subframes available in the RAR window, and the Ri's of R2-R4 are greater than the number of subframes available in the RAR window. In the example of FIG. 4, UE 115 may determine that enough repetitions of a channel may be present within the RAR window to decode the channel using hypothesis R1 and that enough repetitions of a channel do not exist within the RAR window to decode the channel using hypotheses R2-R4. UE 115 may be configured to, based on this determination, attempt to decode a channel using hypothesis R1 and skip attempting to decode the channel using hypotheses R2-R4. Although the example of FIGS. 3 and 4 are presented, it is contemplated that different combinations of SIBs, DL-Bitmaps, DL-Gaps, and NPRACH and NPDCCH parameters may be implemented. In some examples, the RAR window size may be a multiple of the DL-Gap period and the SI-window and the SI-window may be a multiple of the DL-Gap period and a DL-Bitmap length. In other examples, the RAR window size may not be a multiple of the DL-Gap period and/or the SI-window, and/or the SI-window may not be a multiple of the DL-Gap period and the DL-Bitmap length. Computation and/or determination of whether an adequate amount of subframes exists for a channel in the RAR-window for a given hypothesis may be performed manually.

UE 115 may decode the configuration information (e.g., SIB1-NB and SIB2-NB) and determine the parameters for random access. Based on the parameters, UE 115 may, a priori, determine whether it may receive a sufficient number of repetitions of a channel for a given hypothesis before transmitting a random access preamble and/or before attempting to decode a RAR. UE 115 may attempt to decode a RAR using a hypothesis for which at least Ri repetitions are available in the RAR window and may skip decoding using a hypothesis for which at least Ri repetitions are not available in the RAR window. In one example, if the number of available subframes for a channel within an RAR window is less than the lowest Ri (e.g., R1=Rmax/8), UE 115 may abort a random access process (e.g., stop transmitting MSG 1 or refrain from initiating the transmission of MSG 1).

In some scenarios, SIBx-NB transmission may be sporadic in nature and may occupy many resources in an RAR window. In one aspect, UE 115 may be configured to plan the transmission of MSG 1 when the associated RAR may not collide with SIBx-NB based on the configuration. When a collision is expected in a first attempt of RACH and available resources in the RAR window are less than the lowest Ri (e.g., R1=Rmax/8), UE 115 may abort the RACH process. If a SIBx-NB periodicity is relatively high, a sufficient number of repetitions may be available in further RACH attempts.

Figure 5:
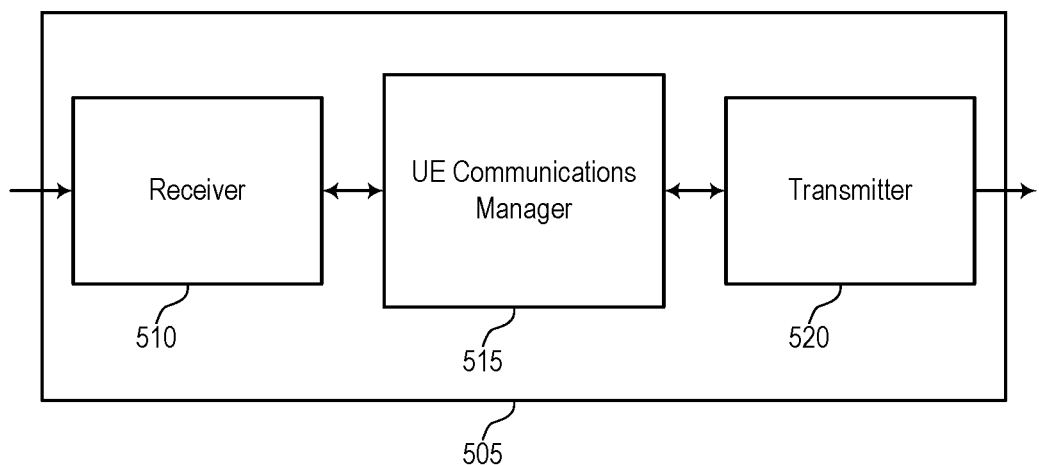
FIGS. 5 and 6 show block diagrams of a device that supports random access procedure modification in IoT communication in accordance with aspects of the present disclosure.

FIG. 5 shows a block diagram 500 of a wireless device 505 that supports random access procedure modification in IoT communications in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with, or coupled to, one another (e.g., via one or more buses).

Receiver 510 may receive information such as packets, user data, or control information associated with various information channels (e.g., control channels, data channels, and configuration information that may enable wireless device 505 to modify a random access procedure, etc.). Information may be passed on to other components of the device. The receiver 510 may utilize a single antenna or a set of antennas. The receiver 510 may be an example of aspects of the transceiver 635 described with reference to FIG. 6. Receiver 310 may receive other signals, such an RAR as described with reference to FIGS. 1-4.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE communications manager 515 may be an example of aspects of the UE communications manager 615 described with reference to FIG. 6.

UE communications manager 515 may determine a number of subframes available for a channel within an RAR time window and may modify a random access procedure as described with reference to FIGS. 1-4. For example, UE communication manager 515 may determine a number of subframe repetitions associated with a decoding hypothesis and compare the number of subframes available within the RAR time window to the number of subframe repetitions. Based on the comparison, UE communication manager 515 may modify the random access procedure (e.g., skip attempting to decode a RAR using the decoding hypothesis, abort RACH).

Transmitter 520 may transmit signals generated by other components of the device. In some examples, the transmitter 520 may be collocated with a receiver 510 in a transceiver module. For example, the transmitter 520 may be an example of aspects of the transceiver 635 described with reference to FIG. 6. The transmitter 620 may utilize a single antenna or a set of antennas. Transmitter 520 may transmit signals such as a random access preamble and other RACH signals, as described with reference to FIGS. 1-4.

Figure 6:
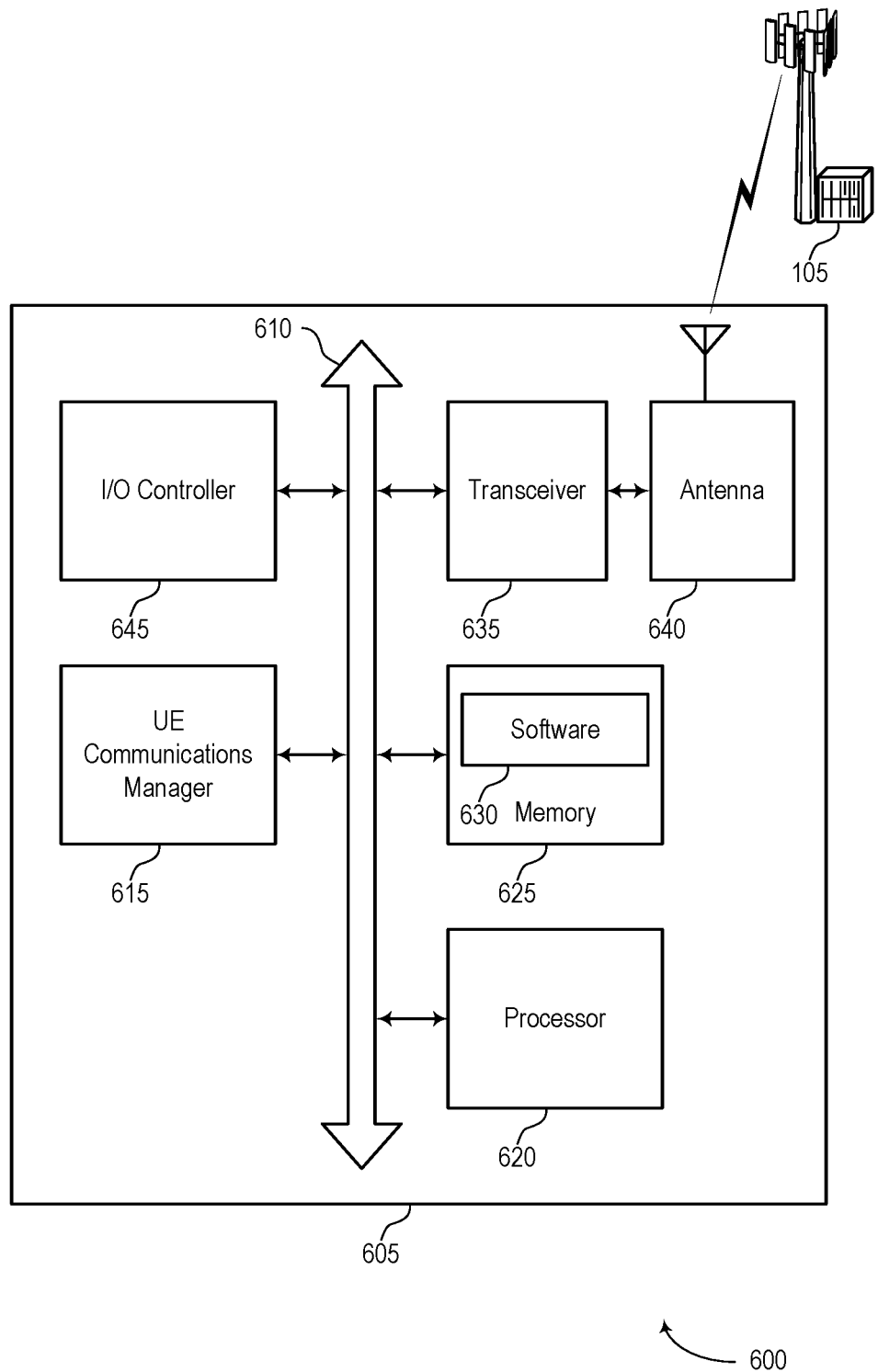

FIG. 6 shows a diagram of a system 600 including a device 605 that supports random access procedure modification in IoT communication in accordance with aspects of the present disclosure. Device 605 may be an example of or include the components of wireless device 505, or a UE 115 as described above, e.g., with reference to FIGS. 1-5. Device 605 may include components for bi-directional voice and data communications including components for transmitting and receiving communications, including UE communications manager 615, processor 620, memory 625, software 630, transceiver 635, antenna 640, and I/O controller 645. These components may be in communication, or coupled to each other, via one or more buses (e.g., bus 610). Device 605 may communicate wirelessly with one or more base stations 105.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting random access procedure modification in IoT communication).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware or software operation such as the interaction with peripheral components or devices.

Software 630 may include code to implement aspects of the present disclosure, including code to support random access procedure modification in IoT communication. Software 630 may be stored in a non-transitory computer-readable medium such as system memory or other memory. In some cases, the software 630 may not be directly executable by the processor but may cause a computer (e.g., when compiled and executed) to perform functions described herein.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets from signals received from the antennas.

In some cases, the wireless device may include a single antenna 640. However, in some cases the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some cases, I/O controller 645 may represent a physical connection or port to an external peripheral. In some cases, I/O controller 645 may utilize an operating system such as iOS®, ANDROID®, MS-DOS®, MS-WINDOWS®, OS/2®, UNIX®, LINUX®, or another known operating system. In other cases, I/O controller 645 may represent or interact with a modem, a keyboard, a mouse, a touchscreen, or a similar device. In some cases, I/O controller 645 may be implemented as part of a processor. In some cases, a user may interact with device 605 via I/O controller 645 or via hardware components controlled by I/O controller 645.

Figure 7:
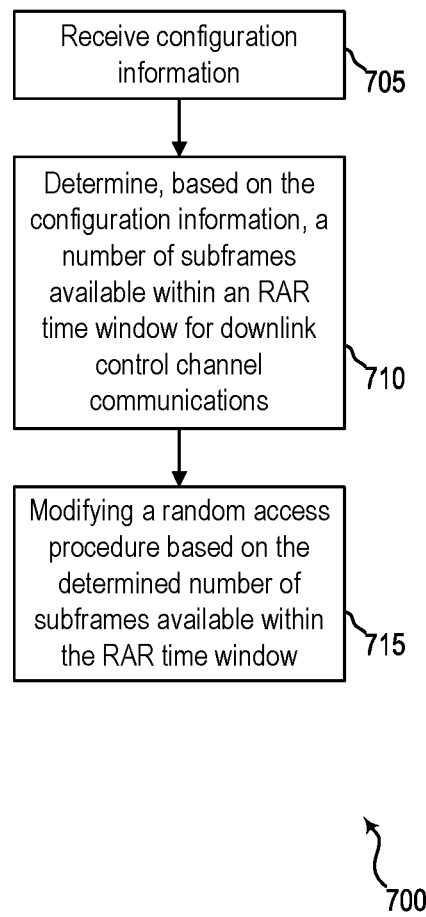
FIGS. 7 and 8 illustrate flow diagrams of methods for random access procedure modification in IoT communication in accordance with aspects of the present disclosure.

FIG. 7 shows a flowchart illustrating a method 700 for random access procedure modification in IoT communication in accordance with aspects of the present disclosure. The operations of method 700 may be implemented by a UE 115 or its components as described herein. For example, the operations of method 700 may be performed by a UE communications manager as described with reference to FIGS. 5 and 6. In some examples, a UE 115 may execute a set of codes to control the functional elements of the device to perform the functions described below. Additionally or alternatively, the UE 115 may perform aspects of the functions described below using special-purpose hardware.

At block 705 the UE 115 may receive configuration information from a base station 105. The configuration information may include system information such as parameters for a random access procedure. The operations of block 705 may be performed according to the methods described herein. In certain examples, aspects of the operations of block 705 may be performed by a receiver as described with reference to FIGS. 5 and 6.

At block 710 the UE 115 may determine, based on the configuration information, a number of subframes available within an RAR time window for downlink control channel communications. The operations of block 710 may be performed according to the methods described herein. In certain examples, aspects of the operations of block 710 may be performed by a UE communications manager as described with reference to FIGS. 5 and 6.

At block 715 the UE 115 may modify a random access procedure based on the determined number of subframes available with the RAR time window. The operations of block 715 may be performed according to the methods described herein. In certain examples, aspects of the operations of block 715 may be performed by a UE communications manager as described with reference to FIGS. 5 and 6.

Figure 8:
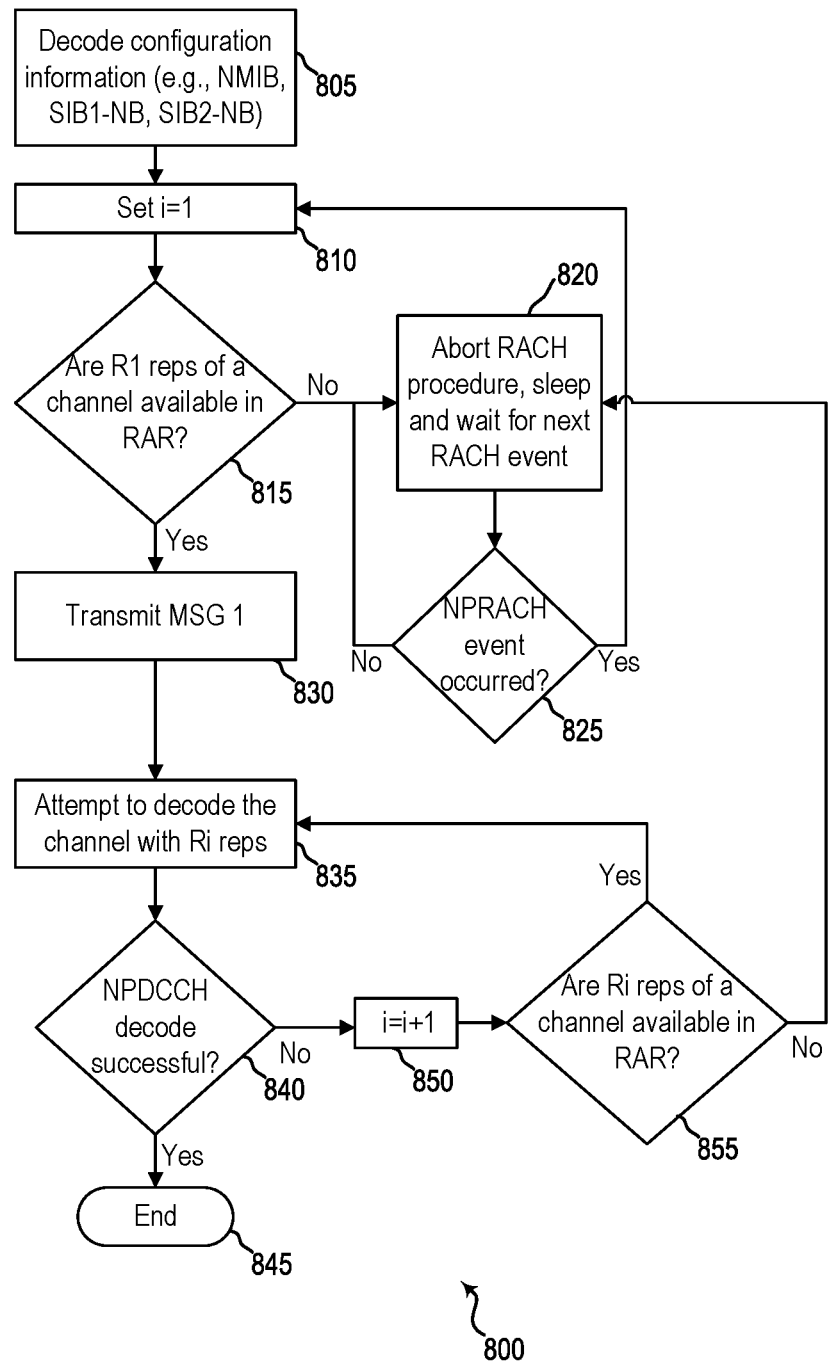

FIG. 8 shows a flowchart illustrating a method 800 for random access procedure modification in IoT communication in accordance with aspects of the present disclosure. Method 800 is one example method for modifying a random access procedure. The operations of method 800 may be implemented by a UE 115 or its components as described herein. For example, method 800 may be performed by a UE communications manager as described with reference to FIGS. 5 and 6. In some examples, a UE 115 may execute a set of codes to control the functional elements of the device to perform the functions described below. Additionally or alternatively, the UE 115 may perform aspects of the functions described below using special-purpose hardware.

At block 805, UE 115 decodes configuration information received from base station 105. The configuration information may include system information (e.g., from MIBs and/or SIBs) such as parameters for a random access procedure. The operations of block 805 may be performed according to the methods described herein. In certain examples, aspects of the operations of block 705 may be performed by a UE communications manager as described with reference to FIGS. 5 and 6.

At block 810, UE 115 sets a parameter i to 1. The parameter i may be associated with decoding hypotheses and may represent the ith decoding hypothesis among the decoding hypotheses. The operations of block 810 may be performed according to the methods described herein. In certain examples, aspects of the operations of block 810 may be performed by a UE communications manager as described with reference to FIGS. 5 and 6.

At block 815, UE 115 determines if R1 repetitions (e.g., Rmax/8 repetitions) of a channel (e.g., NPDCCH) would be present in an RAR based at least in part on the parameters in the configuration information. The operations of block 815 may be performed according to the methods described herein (e.g., as described with reference to FIGS. 3 and 4). In certain examples, aspects of the operations of block 815 may be performed by a UE communications manager as described with reference to FIGS. 5 and 6.

If R1 repetitions would not be present, method 800 proceeds to block 820 where UE 115 aborts RACH. In this scenario, RACH may be aborted before transmitting MSG 1. UE 115 may sleep and wait for a next RACH (e.g., NPRACH) event. The operations of block 820 may be performed according to the methods described herein. In certain examples, aspects of the operations of block 820 may be performed by a UE communications manager as described with reference to FIGS. 5 and 6.

At block 825, UE 115 determines if a next RACH event occurs. If a next RACH event occurs, UE 115 may proceed back to block 810. If a next RACH even has not occurred, UE 115 remains in a loop between block 820 and block 825.

The operations of block 825 may be performed according to the methods described herein. In certain examples, aspects of the operations of block 825 may be performed by a UE communications manager as described with reference to FIGS. 5 and 6.

Back at block 815, if R1 repetitions would be present, method 800 proceeds to block 830 where UE 115 transmits MSG 1 (random access preamble). The operations of block 830 may be performed according to the methods described herein. In certain examples, aspects of the operations of block 830 may be performed by transmitter as described with reference to FIGS. 5 and 6.

At block 835 the UE 115 attempts to decode a RAR received from the base station 105. In particular, UE 115 may attempt to decode the channel (e.g., NPDCCH) using decoding hypothesis i (e.g., i=1 during the first decode attempt) with Ri repetitions. The operations of block 835 may be performed according to the methods described herein. In certain examples, aspects of the operations of block 835 may be performed by a UE communications manager as described with reference to FIGS. 5 and 6.

At block 840, UE 115 determines whether it has successfully decoded the channel using Ri repetitions. The operations of block 840 may be performed according to the methods described herein. In certain examples, aspects of the operations of block 840 may be performed by a UE communications manager as described with reference to FIGS. 5 and 6.

If the UE 115 has successfully decoded the channel using Ri repetitions, the method 800 proceeds to block 845 where the method ends. The operations of block 845 may be performed according to the methods described herein. In certain examples, aspects of the operations of block 845 may be performed by a UE communications manager as described with reference to FIGS. 5 and 6.

If the UE 115 has not successfully decoded the channel using Ri repetitions, the method 800 proceeds to block 850 where the parameter i is increased by 1. The operations of block 850 may be performed according to the methods described herein. In certain examples, aspects of the operations of block 850 may be performed by a UE communications manager as described with reference to FIGS. 5 and 6.

At block 855, UE 115 determines whether Ri repetitions (e.g., R2, R3 or R4 repetitions) of the channel (e.g., NPDCCH) are present in the RAR based at least in part on the parameters in the configuration information. The operations of block 855 may be performed according to the methods described herein (e.g., as described with reference to FIGS. 3 and 4). In certain examples, aspects of the operations of block 855 may be performed by a UE communications manager as described with reference to FIGS. 5 and 6.

If Ri repetitions are not present in the RAR, method 800 proceeds to block 820 where UE 115 skips attempting to decode using Ri repetitions and aborts RACH. UE 115 may sleep and wait for a next RACH (e.g., NPRACH) event. If Ri repetitions are present in the RAR, method 800 returns to block 835 where UE 115 attempts to decode the channel with the new decoding hypothesis Ri (e.g., R2, R3 or R4).

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving configuration information from a base station;
    determining, based at least in part on the configuration information, a number of subframes available within a random access response (RAR) time window for downlink control channel communications; and
    modifying a random access procedure based at least in part on the determined number of subframes available within the RAR time window for the downlink control channel communications.

2. The method of claim 1, further comprising:
    determining a number of subframe repetitions associated with a decoding hypothesis; and
    comparing the number of subframes available to the number of subframe repetitions associated with the decoding hypothesis.

3. The method of claim 2, wherein the modifying the random access procedure comprises skipping a decoding attempt using the decoding hypothesis in response to the number of subframes available being less than the number of subframe repetitions associated with the decoding hypothesis.

4. The method of claim 2, wherein the modifying the random access procedure comprises aborting the random access procedure in response to the number of subframes available being less than the number of subframe repetitions associated with the decoding hypothesis.

5. The method of claim 2, wherein the decoding hypothesis is a first one of multiple decoding hypothesis, and each of the multiple decoding hypothesis has a number of subframe repetitions associated therewith.

6. The method of claim 5, wherein the multiple decoding hypothesis include the first decoding hypothesis and a second decoding hypothesis, and
wherein the first decoding hypothesis has a first number of subframe repetitions associated therewith and the second decoding hypothesis has a second number of subframe repetitions associated therewith, the second number of subframe repetitions being different from the first number of subframe repetitions.

7. The method of claim 6, further comprising determining, based at least in part on the configuration information, the first number of subframe repetitions and the second number of subframe repetitions.

8. The method of claim 7, wherein the configuration information includes a maximum number of repetitions (Rmax) of a downlink control channel, and further comprising determining, based at least in part on the Rmax, the first number of subframe repetitions and the second number of subframe repetitions.

9. The method of claim 6, wherein the multiple decoding hypothesis include a third decoding hypothesis and a fourth decoding hypothesis, and wherein the third decoding hypothesis has a third number of subframe repetitions associated therewith, and the fourth decoding hypothesis has a fourth number of subframe repetitions associated therewith.

10. The method of claim 6, further comprising:
comparing the number of subframes available to the first number of subframe repetitions; and
in response to the number of subframes available being less than the first number of subframe repetitions, aborting the random access procedure.

11. The method of claim 6, further comprising:
comparing the number of subframes available to the first number of subframe repetitions; and
in response to the number of subframes available being equal to or greater than the first number of subframe repetitions:
transmitting a random access procedure message;
receiving a RAR message; and
decoding the RAR message using the first decoding hypothesis.

12. The method of claim 11, further comprising:
in response to an unsuccessful decode of the RAR message using the first decoding hypothesis:
comparing the number of subframes available to the second number of subframe repetitions associated with the second decoding hypothesis; and
in response to the number of subframes available being equal to or greater than the second number of subframe repetitions, decoding the RAR message using the second decoding hypothesis.

13. The method of claim 2, wherein the number of subframe repetitions associated with the decoding hypothesis represents a threshold number of subframe repetitions needed to decode a downlink control channel using the decoding hypothesis.

14. The method of claim 1, further comprising communicating with the base station over a narrowband Internet of Things (NB-IoT) carrier that has resources that are time shared with one or more other radio access technologies (RATs).

15. The method of claim 14, wherein the configuration information includes downlink bitmap and downlink gap information.

16. The method of claim 1, further comprising:
determining a system information block x for narrowband (SIBx-NB) transmission schedule based on the configuration information; and
modifying the random access procedure based on the SIBx-NB transmission schedule.

17. A user equipment (UE) for wireless communication, comprising:
a processor;
memory coupled to the processor; and
instructions stored in the memory and operable, when executed by the processor, to cause the UE to:
receive configuration information from a base station;
determine, based at least in part on the configuration information, a number of subframes available within a random access response (RAR) time window for downlink control channel communications; and
modify a random access procedure based on the determined number of subframes available within the RAR time window for the downlink control channel communications.

18. The UE of claim 17, wherein the instructions are further operable, when executed by the processor, to cause the UE to:
determine a number of subframe repetitions associated with a decoding hypothesis; and
compare the number of subframes available to the number of subframe repetitions associated with the decoding hypothesis.

19. The UE of claim 18, wherein the instructions are further operable, when executed by the processor, to cause the UE to skip a decoding attempt using the decoding hypothesis in response to the number of subframes available being less than the number of subframe repetitions associated with the decoding hypothesis.

20. The UE of claim 18, wherein the instructions are further operable, when executed by the processor, to cause the UE to abort the random access procedure in response to the number of subframes available being less than the number of subframe repetitions associated with the decoding hypothesis.

21. The UE of claim 18, wherein the decoding hypothesis is a first one of multiple decoding hypothesis, and each of the multiple decoding hypothesis has a number of subframe repetitions associated therewith.

22. The UE of claim 21, wherein the multiple decoding hypothesis include the first decoding hypothesis and a second decoding hypothesis, and
wherein the first decoding hypothesis has a first number of subframe repetitions associated therewith and the second decoding hypothesis has a second number of subframe repetitions associated therewith, the second number of subframe repetitions being different from the first number of subframe repetitions.

23. The UE of claim 22, wherein the instructions are further operable, when executed by the processor, to cause the UE to determine, based at least in part on the configuration information, the first number of subframe repetitions and the second number of subframe repetitions.

24. The UE of claim 23, wherein the configuration information includes a maximum number of repetitions (Rmax) of a downlink control channel, and wherein the instructions are further operable, when executed by the processor, to cause the UE to determine, based at least in part on the Rmax, the first number of subframe repetitions and the second number of subframe repetitions.

25. The UE of claim 22, wherein the multiple decoding hypothesis include a third decoding hypothesis and a fourth decoding hypothesis, and wherein the third decoding hypothesis has a third number of subframe repetitions associated therewith, and the fourth decoding hypothesis has a fourth number of subframe repetitions associated therewith.

26. The UE of claim 22, wherein the instructions are further operable, when executed by the processor, to cause the UE to:
compare the number of subframes available to the first number of subframe repetitions; and
in response to the number of subframes available being less than the first number of subframe repetitions, abort the random access procedure.

27. The UE of claim 22, wherein the instructions are further operable, when executed by the processor, to cause the UE to:
compare the number of subframes available to the first number of subframe repetitions; and
in response to the number of subframes available being equal to or greater than the first number of subframe repetitions:
transmit a random access procedure message;
receive a RAR message; and
decode the RAR message using the first decoding hypothesis.

28. The UE of claim 27, wherein the instructions are further operable, when executed by the processor, to cause the UE to:
in response to an unsuccessful decode of the RAR message using the first decoding hypothesis:
compare the number of subframes available to the second number of subframe repetitions associated with the second decoding hypothesis; and
in response to the number of subframes available being equal to or greater than the second number of subframe repetitions, decode the RAR message using the second decoding hypothesis.

29. An apparatus for wireless communication, comprising:
means for receiving configuration information from a base station;
means for determining, based at least in part on the configuration information, a number of subframes available within a random access response (RAR) time window for downlink control channel communications; and
means for modifying a random access procedure based on the determined number of subframes available within the RAR time window for the downlink control channel communications.

30. A non-transitory computer readable medium storing code for wireless communication, the code comprising instructions executable by a processor to:
receive configuration information from a base station;
determine, based at least in part on the configuration information, a number of subframes available within a random access response (RAR) time window for downlink control channel communications; and
modify a random access procedure based on the determined number of subframes available within the RAR time window for the downlink control channel communications.

* * * * *